COMPLEMENTING FLIP-FLOPS

Filed Dec. 20, 1956 2 Sheets-Sheet 1

INVENTOR.
EDWARD GARY CLARK
BY
Edward W. Hughes
ATTORNEY

July 19, 1960 E. G. CLARK 2,945,965

COMPLEMENTING FLIP-FLOPS

Filed Dec. 20, 1956 2 Sheets-Sheet 2

INVENTOR.
EDWARD GARY CLARK

BY

Edward W. Hughes

ATTORNEY

United States Patent Office 2,945,965

Patented July 19, 1960

2,945,965

COMPLEMENTING FLIP-FLOPS

Edward Gary Clark, Oreland, Pa., assignor to Burroughs Corporation, Detroit, Mich., a corporation of Michigan Filed Dec. 20, 1956, Ser. No. 629,570

5 Claims. (Cl. 307—88.5)

This invention relates to bistable devices, and more particularly, to complementing flip-flops.

A flip-flop is a device having two stable states and two input terminals (or types of input signals) each of which corresponds with one of the two states. The device remains in either of its two states until caused to change to its other state by the application of the corresponding signal. A flip-flop may be changed to a complementing flip-flop by the addition of steering gates. Means are provided for coupling the steering gates to the flip-flop and to a single input terminal. By the application of pulses to the input terminal, signals are generated in the steering gates which cause the flip-flop to change state for each pulse applied.

In a complementing flip-flop having two steering gates, one of which is enabled and the other of which is disabled, the action in response to each complementing input signal, or each complementing input pulse, can be divided into two events. The first event results from applying a complementing pulse to the enabled steering gate. The enabled steering gate then applies a pulse to the proper input terminal of the flip-flop, which pulse causes the flip-flop to change to its other state. The second event is the reversal of the steering gates in preparation for the next pulse of the complementing input signal.

When the steering gates reverse, the gate that was enabled at the time the first complementing pulse was initially applied becomes disabled, and the gate that was disabled becomes enabled. Each complementing input pulse has a given width, the period of time the pulse is present or applied. A phenomena known in the art as time race occurs if the steering gates reverse while the complementing pulse, which is responsible for the reversal, is still present. When time race occurs, the complementing input pulse will cause the flip-flop to return to its initial state; and the flip-flop will continue to change state, or oscillate, as long as the complementing input pulse is present. The final state of the complementing flip-flop will then be a function of the pulse width of each complementing input pulse.

Time race has heretofore been avoided by delaying the reversal of the steering gates due to the change of state of the flip-flop for a fixed period of time by various types of delay circuits, such as integrating circuits, delay lines, etc. A complementing flip-flop having some means for delaying the reversal of the steering gates for a fixed period will hereafter be referred to as having unconditional steering. Time race in a complementing flip-flop having unconditional steering is prevented by restricting the width of each complementing pulse of the input signal so that it is less than the period of the delay. When a plurality of complementing flip-flops are cascaded to form a counter, it is necessary to provide pulse standardizers between the stages or to provide the equivalent internal action limiting the effective duration (or more specifically, the amplitude time product) of the complementing pulse inputs. As a result, the maximum pulse repetition frequency for a complementing flip-flop having unconditional steering means is substantially less than the maximum pulse repetition frequency of the corresponding noncomplementing flip-flop because of the design tolerances required for the delay circuits and the input pulse standardizer circuits.

The complementing flip-flops disclosed and claimed herein are provided with conditional steering means. When a complementing input pulse is applied to one of these circuits, the enabled steering gate applies a pulse to the input terminal of the flip-flop, which pulse will cause the flip-flop to change its state. Means are provided to prevent reversal of the steering gates until each complementing pulse of the input signal terminates, or is no longer present. Thus the reversal of the steering gates is conditioned upon the removal of each complementing input pulse.

Conditional steering represents the ideal means for preventing time race in a complementing flip-flop since the length of the period of the delay between the change in state of the flip-flop and the reversal of the steering gates is determined by the width of each complementing input pulse. As a consequence, a complementing flip-flop with conditional steering means, as taught herein, will operate with complementing input pulses, the width of which may be of indefinite duration, a change in D.-C. level. Since there are no fixed time delays incorporated in a complementing flip-flop having conditional steering, the maximum pulse repetition frequency of a complementing flip-flop with conditional steering is substantially the upper frequency limit of the corresponding noncomplementing flip-flop.

It is, therefore, an object of this invention to provide improved complementing flip-flops.

A further object of this invention is to provide complementing flip-flops having conditional steering means.

It is a still further object of this invention to provide complementing flip-flops in which the reversal of the steering means is conditioned upon the removal of each complementing input pulse.

It is another object of this invention to provide a complementing flip-flop, the upper frequency limit of which is substantially independent of the steering means.

It is still another object of this invention to provide complementing flip-flops in which the width of each complementing input pulse may be substantially of any duration.

It is another object of this invention to provide complementing flip-flops in which the pulse width of each complementing input pulse, in excess of that necessary to trigger the complementing flip-flop is not a factor in the proper operation of the complementing flip-flops.

Other objects and many of the attendant advantages of this invention will be readily appreciated as the same become better understood by reference to the following detailed description when considered in connection with the accompanying drawings.

Figure 2:
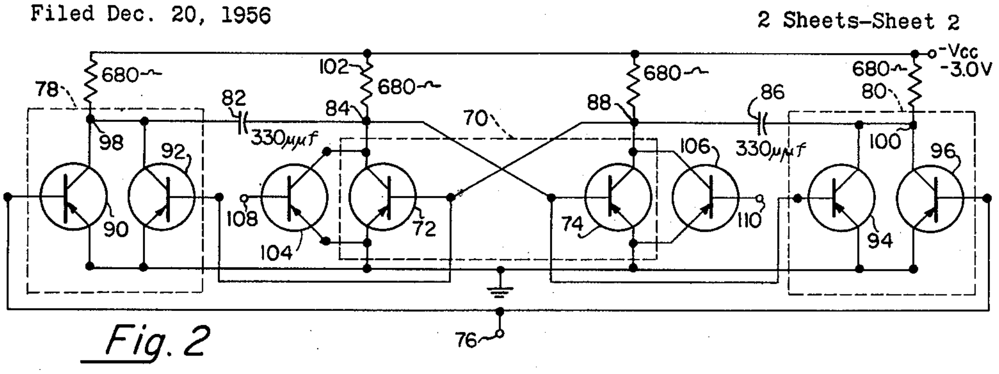
Fig. 2 is a schematic diagram of a second embodiment of the invention.
Figure 4:
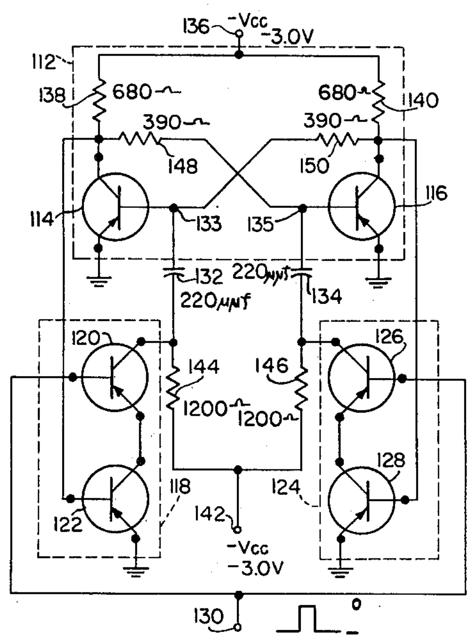
Figure 5:
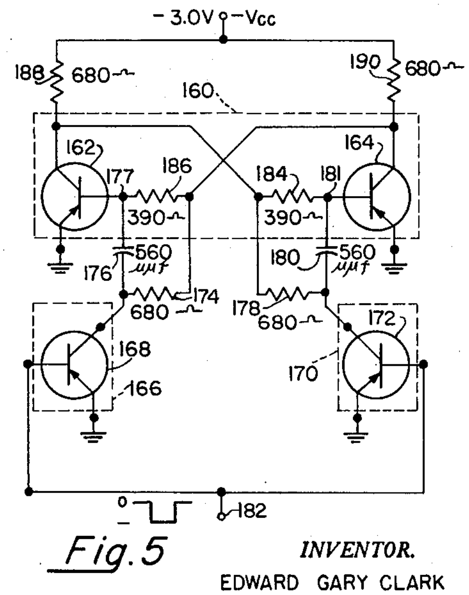

Figs. 3*a*, 3*b*, 3*c*, and 3*d* are wave forms illustrating the operation of the circuit of Fig. 2;

Fig. 4 is a schematic diagram of a third embodiment of the invention;

Fig. 5 is a schematic diagram of a fourth embodiment of the invention; and

Figure 6:
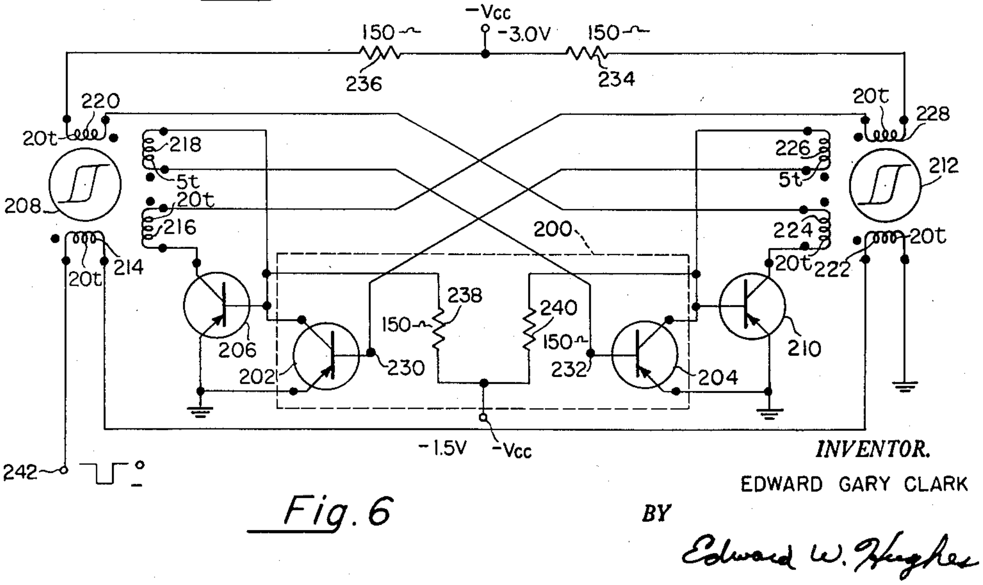

Fig. 6 is a schematic diagram of a fifth embodiment of the invention.

Figure 1:
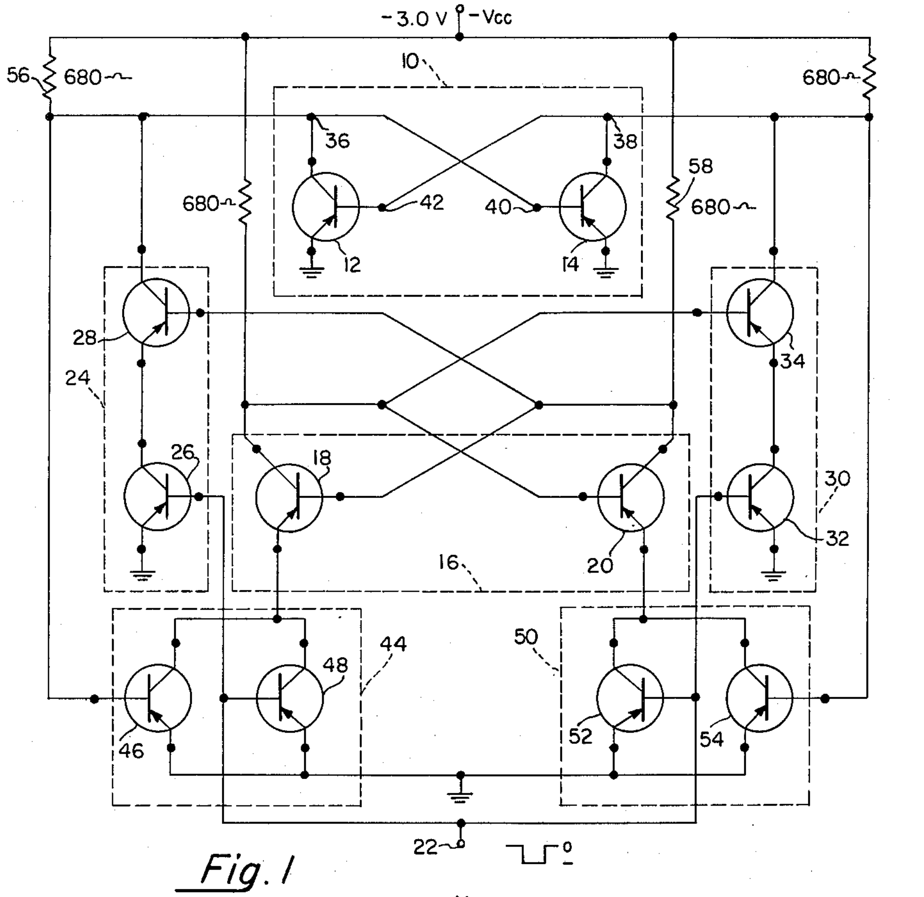
Fig. 1 is a schematic diagram of one form of complementing flip-flop provided with a conditional steering means.

In Fig. 1 there is illustrated a complementing flip-flop having one form of conditional steering. Master flip-flop 10 is a cross-coupled saturation flip-flop using direct-coupled junction transistors 12, 14. The complementing flip-flop also includes a second internal, or isolating, flip-flop 16 which is also a cross-coupled saturation flip-flop using direct-coupled junction transistors 18, 20.

Master flip-flop 10 is triggered by the leading edge of a negative input step, or pulse, being applied to input terminal 22. Each input pulse is applied to series steering gate 24, which consists of junction transistors 26, 28 and to series steering gate 30, which consists of junction transistors 32, 34. Gates 24 and 30 are connected, respectively, to input terminals 36, 38 of master flip-flop 10. Input terminal 36 is also directly connected to base 40 of transistor 14, and terminal 38 is also connected to base 42 of transistor 12, so that flip-flop 10 is base triggered. Internal flip-flop 16 is triggered through either parallel inhibit gate 44, which consists of junction transistors 46, 48, or through parallel inhibit gate 50, which consists of junction transistors 52, 54.

It is possible to design circuits using pnp junction transistors of the alloy or surface barrier types; i.e., in the common emitter configuration, so that the transistors of such circuits will saturate, or bottom, if the potential of their bases with respect to their emitters, which are generally at ground potential, are more negative than —0.3 v. and so that the transistors will be substantially biased off if the potentials of their bases with respect to their emitters are approximately —0.1 v., or more positive. These voltages obviously may vary depending on the characteristics of the transistors used, as is well known in the art. In such circuits the potential of the collector of a bottomed transistor will be approximately —0.1 v., or more positive, or approximately at ground potential, which potential, when applied to the base of a transistor in a similar configuration, is sufficient to cut off the transistor. The devices described and illustrated as examples of embodiments of the invention use transistor circuits having substantially such operating characteristics.

In explaining the operation of the device of Fig. 1, it is assumed that initially transistor 14 is saturated, or bottomed, and that transistor 12 is cut off. As a result, terminal 36 and base 40 are sufficiently negative to maintain transistor 14 bottomed. The collector of bottomed transistor 14 will be substantially at ground level. Since the collector of transistor 14 and input terminal 38 are directly connected to base 42 of transistor 12, the potential of the base of transistor 12 maintains it cut off. The potential of terminal 36 is determined by the magnitude of the collector supply $V_{cc}$, the magnitude of load resistor 56, and the magnitudes of the base currents drawn by transistors 14, 46.

The base of transistor 46 of inhibit gate 44 is connected to input terminal 36 so that transistor 46 is bottomed, causing its collector to be substantially at ground potential. The base of transistor 54 of inhibit gate 50 is directly connected to input terminal 38, which is substantially at ground potential; and therefore, transistor 54 will be cut off. The base of transistor 18 of internal flip-flop 16 is connected through load resistor 58 to the collector supply potential $V_{cc}$, which causes transistor 18 to bottom since the emitter of transistor 18 is connected to ground through bottomed transistor 46. The base of transistor 34 of steering gate 30 is directly connected to the collector of transistor 18, which is susbtantially at ground potential, so that transistor 34 is biased off and gate 30 is disabled. The base of transistor 20 of internal flip-flop 16 is connected to the collector of transistor 18, which keeps transistor 20 cut off. The collector of transistor 20 is at a negative potential determined by $V_{cc}$ and the voltage drop across load resistor 58 caused primarily by the base current drawn by transistor 18. The collector of transistor 20 is sufficiently negative to maintain transistor 18 bottomed and to maintain transistor 28 bottomed when its emitter circuit is closed; i.e., connected to ground.

Transistors 26, 48, 52, and 32 are biased off because the potential of input terminal 22, in the absence of a complementing input pulse, is substantially at ground level. If the emitter of transistor 28 were connected to ground, it would bottom, and the potential of its collector would be substantially at ground level. However, since the emitter of transistor 28 is connected to the collector of transistor 26, which is cut off, the emitter circuit of transistor 28 is open; and transistor 28 has substantially no effect on the potential of terminal 36 under these circumstances. Gate 24, when in the condition just described with a negative potential on the base of transistor 28, is enabled.

When a negative complementing input pulse is applied to terminal 22, it causes the bases of transistors 26, 48, 52, and 32 to become sufficiently negative to bottom these transistors. When transistor 26 of enabled steering gate 24 bottoms, the emitter circuit of transistor 28 is closed and transistor 28 bottoms. This raises input terminal 36 and base 40 of transistor 14 substantially to ground potential, cutting off transistor 14. When transistor 14 cuts off, the potential of its collector becomes sufficiently negative to cause transistor 12 to bottom, which maintains transistor 14 cut off; and master flip-flop 10 has changed to its other state.

The application of the first complementing input pulse to the base of transistor 48 of gate 44 causes it to bottom. The bottoming of transistor 48 does not substantially change the potential of the emitter of transistor 18 of the internal flip-flop 16 since transistor 46 was initially bottomed. When the first complementing input pulse causes input terminal 36 to be raised substantially to ground potential, this raises the base of transistor 46 substantially to ground potential and cuts off transistor 46. However, the emitter of transistor 18 is still connected to ground through transistor 48, so that internal flip-flop 16 is not affected by the change of state of master flip-flop 10 while the first complementing input pulse is still present or still applied to input terminal 22.

The application of the first complementing input pulse to the base of transistor 52 causes it to bottom so that the emitter of transistor 20 is substantially at ground potential. The negative complementing input pulse applied to the base of transistor 32 of disabled gate 30 bottoms transistor 32, which causes the potential of emitter of transistor 34 to be susbtantially at ground potential. However, since the base of transistor 34 is at substantially ground potential, transistor 34 remains cut off.

Thus when a complementing input pulse is applied with the complementing flip-flop in its previously defined initial condition, the enabled steering gate 24 applies a pulse of the proper polarity to input terminal 36, which causes master flip-flop 10 to change its state. Steering gate 30, which is initially disabled, does not affect the potential of input terminal 38 when the initial or first pulse is applied. After master flip-flop 10 changes state due to the application of the first input pulse, the potential of input terminal 36 is substantially at ground level and the potential of input terminal 38 is at a negative potential. This cuts off transistor 46 of inhibit gate 44 and bottoms transistor 54 of inhibit gate 50. This, however, does not affect the state of internal flip-flop 16 since the emitter circuits of transistor 18, 20 are both closed during the period of time that the input pulse is present through bottomed transistors 48, 52. Thus during the period of time the first input pulse is applied to terminal 22, internal flip-flop 16 is inhibited from changing state as a result of master flip-flop 10 changing state in response to the application of the first complementing pulse.

When the first complementing pulse terminates, transistors 26, 48, 52, and 32 cut off. Transistor 18 is cut off because its emitter circuit is open, i.e., it is no longer connected to ground, since both transistors 46, 48 of inhibit gate 44 are cut off. This causes the potential of the collector of transistor 18 to become negative, which bottoms transistor 20 whose emitter is connected to ground through bottomed transistor 54, and internal flip-flop 16 changes its state. When internal flip-flop 16 changes its state at the end of the first complementing pulse, the base of transistor 34 becomes negative, enabling steering gate 30. When transistor 20 bottoms, the potential of its collector is substantially at ground level since its emitter is connected to ground through transistor 54. The substantially ground potential of the collector of transistor 20 cuts off transistor 28, disabling gate 24, and maintains transistor 18 cut off.

The next, or second, complementing input pulse causes enabled steering gate 30 to raise the potential of input terminal 38 substantially to ground level, which causes the master flip-flop 10 to change its state. The presence of this second input pulse on the bases of transistors 48, 52 of inhibit gates 44, 50 prevents internal flip-flop 16 from changing its state as a result of master flip-flop 10 changing its state until after the second pulse has terminated. The change of state of the internal flip-flop 16 after the second pulse has been removed causes steering gate 24 to become enabled and causes steering gate 30 to become disabled, completing a cycle of operation.

The device illustrated in Fig. 1 contains no reactive elements such as capacitors or inductors. As a result, it will operate satisfactorily with complementing pulses having very poor rise and fall times.

The state of the complementing flip-flop of Fig. 1 may be determined by the potentials of the collectors of transistors 12, 14 of master flip-flop 10 or by the potentials of the collectors of transistors 18, 20 of internal flip-flop 16. Thus terminals 36, 38 may serve as output terminals for the complementing flip-flop. If it is desired to set and reset master flip-flop 10 to a predetermined stable state, this may be accomplished by applying a signal to a set transistor connected in parallel with transistor 12 and by applying a signal to a reset transistor connected in parallel with transistor 14, as described and illustrated with respect to the device of Fig. 2.

In the complementing flip-flop illustrated in Fig. 1, D.C. isolation between master flip-flop 10 and the steering gates 24, 30 is achieved by means of internal flip-flop 16. This isolation may be achieved by A.C. coupling of the master flip-flop to the steering gates with a reduction in the number of transistors required.

In Fig. 2 there is illustrated an embodiment of a complementing flip-flop provided with conditional steering means in which A.C. coupling between the master flip-flop and the steering gates is provided. Master flip-flop 70 comprises transistors 72, 74, which are preferably junction transistors which are cross-coupled to provide a saturation flip-flop having two distinguishable stable states. Input signals which are applied to input terminal 76 of the complementing flip-flop are applied to steering and inhibit gates 78, 80. The output of gate 78 is applied through capacitor 82 to input terminal 84 of master flip-flop 70, and the output of gate 80 is applied through capacitor 86 to input terminal 88.

Gate 78 consists of junction transistors 90, 92, which are connected in parallel, and gate 80 consists of junction transistors 94, 96 connected in parallel. Input terminal 76 of the complementing flip-flop is directly connected to the bases of transistors 90, 96 of the steering and inhibit gates 78, 80.

The base of transistor 92 of gate 78 is directly connected to input terminal 88, and the base of transistor 94 of gate 80 is directly connected to input terminal 84. The collectors of transistors 90, 92 of gate 78 are connected by capacitor 82 to input terminal 84 of master flip-flop 70, and the collectors of transistors 94, 96 of gate 78 are connected by capacitor 86 to input terminal 88 of master flip-flop 70.

The wave forms of Figs. 3*a*, 3*b*, 3*c*, and 3*d* illustrate a complete cycle of operation of the device illustrated in Fig. 2. Assuming the initial state of master flip-flop 70 is such that transistor 74 is bottomed and that transistor 72 is cut off, then transistors 90, 92 will both be cut off; since input terminal 88 is substantially at ground potential, and in the absence of an input pulse, input terminal 76 is also substantially at ground potential; the potential of terminal 98 will be negative; and parallel steering and inhibit gate 78 will be enabled. Steering and inhibit gate 80 will be disabled since transistor 94 will be bottomed due to the negative potential of its base, which is connected to input terminal 84, which causes terminal 100 to be substantially at ground potential. The application of the leading edge, or more, of a negative complementing pulse to input terminal 76 at time $t_1$ causes transistor 90 to bottom. When transistor 90 bottoms, the potential of terminal 98 increases, becomes more positive, and reaches a value substantially at ground level. This applies the charge which is on capacitor 82 to input terminal 84 and the base of transistor 74, cutting off transistor 74. Capacitor 82 is charged because the potential of terminal 98 is substantially equal to $V_{cc}$, since substantially no current flows through cut-off transistors 90, 92, while the potential of terminal 84 is more positive; i.e., closer to ground potential, due to the base currents of transistors 74, 94 flowing through load resistor 102 and because of the base clamping action of transistors 74, 94.

When transistor 74 cuts off, the potential of input terminal 88 becomes negative, which negative potential is applied to the base of transistor 72, bottoming it and maintaining the potential of input terminal 84 substantially at ground level; and master flip-flop 70 has changed state. As a result, transistor 94 is cut off, and transistor 92 bottoms. This, however, has no effect on the potential of terminals 98, 100 since they are both held approximately at ground level by the presence of the negative input pulse on the bases of transistors 90, 96.

Figures 3A, 3B, 3C, 3D:
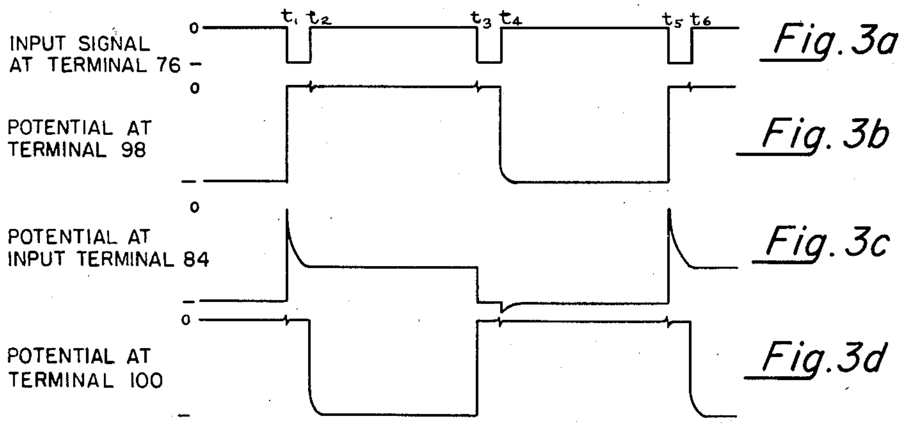

At the conclusion of the first pulse at time $t_2$, gates 78, 80 are released from control by the complementing input pulse, to control by master flip-flop 70. Gates 78, 80 then reverse, assuming the states determined by the master flip-flop; i.e., gate 80 is enabled, and gate 78 is disabled. Capacitor 86 then charges to complete the half cycle. The pulse generated by the charging of capacitor 86 is of such polarity that it has no effect on the master flip-flop 70. In addition, the base clamping action of transistor 72 substantially reduces the amplitude of this pulse. The representation of a similar pulse due to recharging of capacitor 82 at time $t_4$ on Fig. 3*c* is approximately to scale.

At the end of the first half cycle, transistor 72 is bottomed and transistor 74 is cut off, transistors 90, 96 are both cut off, transistor 92 of gate 78 is bottomed, disabling gate 78, and transistor 94 of gate 80 is cut off, enabling gate 80. The application of the next, or second, negative complementing pulse at time $t_3$ bottoms transistor 96 of gate 80, which causes the potential of terminal 100 to become more positive, which in turn applies the charge on capacitor 86 to input terminal 88, cutting off transistor 72. This in turn causes transistor 74 to bottom, changing the state of master flip-flop 70 back to its initial state. As a result of transistor 74 bottoming, transistor 92 is cut off. The potentials of terminals 98, 100 remain substantially at ground level between times $t_3$ and $t_4$ because transistors 90, 96 are both bottomed by the presence of the second complementing pulse. When the second pulse terminates at time $t_4$, transistors 90, 96 both cut off. Transistor 94 is bottomed because of the state of master flip-flop 70, and this disables gate 80. Transistor 92 is cut off because of the state of master flip-flop 70, and this enables gate 78. Capacitor 82 then recharges, completing a cycle of operation.

Transistor 104 is connected in parallel with transistor 72, and transistor 106 is connected in parallel with transistor 74. The application of the negative pulse to set terminal 108 will cause transistor 104 to bottom and will cause the master flip-flop 70 to assume a state in which terminal 84 is substantially at ground potential. The application of a negative pulse to reset terminal 110, which is connected to the base of transistor 106, will cause the master flip-flop 70 to assume its other state, the state in which terminal 88 is substantially at ground potential. The state of the complementing flip-flop may be determined by the potentials of terminal 84 or terminal 88, which may serve as output terminals for the complementing flip-flop.

The recharging times of capacitors 82, 86 limit the maximum pulse repetition frequency of the complementing flip-flop illustrated in Fig. 2. Mathematical analysis indicates that the maximum pulse repetition frequency of the complementing flip-flop is approximately one half that of the corresponding noncomplementing flip-flop; i.e., master flip-flop 70 by itself.

Certain conclusions can be derived from a study of the circuit of Fig. 2 which are useful in deriving the modifications illustrated in Figs. 4 and 5. The steering gates are coupled to the master flip-flop by means of differentiating circuits, which provide D.-C. isolation. The steering gates are enabled or disabled by being directly coupled to the master flip-flop. The change in the enabling D.-C. supplied to enable a steering gate during a flip-flop transition is in the same sense (direction) as the complementing pulse. From this it follows that the pulse from the disabled gate capacitor on the nontriggering edge of the complementing pulse is in the direction to maintain the master flip-flop state produced by the triggering edge. Further, when the differentiation is achieved by capacitive coupling to the bases of the transistors of the master flip-flop, then the D.-C. potential applied to the steering gates must be of such polarity that the charge on the disabled gate coupling capacitor is substantially zero at rest.

In Fig. 4 there is illustrated another form of a conventional steering complementing flip-flop in which the steering gates are coupled by capacitors to the master flip-flop. Master flip-flop 112 is composed of two transistors 114, 116 which are cross-coupled to form a saturation flip-flop. Combined steering and inhibit gate 118 has two transistors 120, 122 connected in series. Similarly, steering and inhibit gate 124 is provided with two transistors 126, 128 connected in series. Input terminal 130 of the complementing flip-flop is directly connected to the bases of transistors 120, 126. The base of transistor 122 of gate 118 is directly connected to the collector of transistor 114 of master flip-flop 112; and the base of transistor 128 is directly connected to the collector of transistor 116 of master flip-flop 112.

The collector of transistor 120 is coupled through capacitor 132 to input terminal 133 of master flip-flop 112, the base of transistor 114. Capacitor 134 is connected between the collector of transistor 126 of gate 124 and input terminal 135 of master flip-flop 112, the base of transistor 116.

Collector supply potential $V_{cc}$ of the proper polarity is applied to terminal 136 and through load resistors 138, 140 to the collectors of transistors 114, 116 of master flip-flop 112. Terminal 142 is also adapted to be connected to a source of collector potential $V_{cc}$ of the proper polarity and is connected through load resistor 144 to the collector of transistor 120 of gate 118 and through load resistor 146 to the collector of transistor 126 of gate 124.

Assuming initially that transistor 114 of master flip-flop 112 is cut off, the potential of its collector will be negative, and this negative potential which is applied through resistor 148 to the base of transistor 116 of input terminal 135 causes it to bottom. When transistor 116 bottoms, its collector increases substantially to ground potential; and since the collector of transistor 116 is connected to the base of transistor 114 through resistor 150, the potential of the collector of transistor 116 maintains transistor 114 cut off. The base of transistor 122 of gate 118 is connected to the collector of transistor 114, and thus transistor 122 is bottomed, causing the potential of the emitter of transistor 120 to be substantially at ground potential. The base of transistor 128, which is directly connected to the collector of transistor 116, is substantially at ground potential, which cuts off transistor 128.

The circuit of Fig. 4 requires that each complementing input pulse be positive going and that the potential of input terminal 130, in the absence of an input pulse, is sufficiently negative to bottom transistors 120, 126 if their emitter circuits are closed. Thus transistor 120 will be bottomed so that the potential of its collector is substantially at ground potential, and gate 118 is enabled. Since transistor 128 is cut off, the emitter circuit of transistor 126 is open, and therefore, the potential of the collector of transistor 126 will be negative and gate 124 is disabled.

The application of positive going complementing pulses to the bases of transistors 120, 126 of gates 118, 124 cuts off these transistors. The potential of the collector of transistor 120, which was heretofore substantially at ground potential, suddenly becomes negative, applying a negative pulse to input terminal 133 of master flip-flop 112, which causes transistor 114 to bottom. The potential of the collector of transistor 114 increases to approximately ground potential, cutting off transistor 116, which changes the state of master flip-flop 112. The base of transistor 122 is now substantially at ground potential, which cuts off transistor 122. The base of transistor 128 is now negative, causing it to bottom. However, so long as the complementing pulse is present, both transistors 120 and 126 will remain cut off and gates 118, 124 cannot reverse.

At the termination of the first complementing pulse, the bases of transistors 120, 126 become negative. Transistor 126 bottoms since its emitter circuit closed when transistor 128 bottomed at the time master flip-flop 112 changed state, and gate 124 is enabled. The collector of transistor 120 remains negative since transistor 122 was biased off when master flip-flop 112 changed state, and gate 118 is disabled. Thus the reversal of transistors 120, 126 and the reversal of gates 118, 124 is conditioned on the removal of the complementing input pulse.

The application of the next, or second, complementing input pulse will cause transistor 126 to cut off. The potential of the collector of transistor 126 drops, or becomes more negative, which applies a negative pulse to the base of transistor 116, causing master flip-flop 112 to change its state once again. As a consequence, the voltages of the bases of transistors 122, 128 reverse, and upon the removal of the second complementing pulse, the gates reverse, with gate 118 becoming enabled and gate 124 becoming disabled.

The state of master flip-flop 112 may be determined by the potentials of the collectors of transistors 114, 116, which may also be the output terminals of the complementing flip-flop, as is well known in the art. Master flip-flop 112 may be set and reset by the use of a pair of transistors, one connected in parallel with transistor 114 and the other connected in parallel with transistor 116, as is illustrated and described with respect to Fig. 2.

The use of A.-C. coupling by the steering and inhibit gates of the master flip-flop permits an even greater reduction in the number of transistors required. The complementing flip-flop illustrated in Fig. 5 has four transistors. Each steering and inhibit gate is comprised of a single transistor.

In Fig. 5 master flip-flop 160 consists of two junction transistors 162, 164, which are cross-coupled to form a saturation flip-flop. Steering and inhibit gate 166 is comprised of transistor 168, and steering and inhibit gate 170 is comprised of transistor 172. The collector of transistor 168 is connected through isolating resistor 174 to the collector of transistor 164 of master flip-flop 160. The collector of transistor 168 is also connected by capacitor 176 to input terminal 177 of master flip-flop 160, the base of transistor 162.

The collector of transistor 172 is connected by isolating resistor 178 to the collector of transistor 162 and is connected by capacitor 180 to input terminal 181 of master flip-flop 160, the base of transistor 164. The bases of transistors 168, 172 are directly connected to input terminal 182 of the complementing flip-flop.

Assuming that transistor 162 of master flip-flop 160 is initially cut off and that transistor 164 is bottomed, then the collector of transistor 162 will be negative with respect to ground, which negative potential is applied to the base of transistor 164 through coupling resistor 184. This negative potential is sufficient to cause and to maintain transistor 164 bottomed. The potential of the collector of the transistor 164 will be substantially at ground level; and since the collector of transistor 164 is connected through coupling resistor 186 to the base of transistor 162, transistor 162 is maintained in its cut-off state. The collector of transistor 168 of gate 166 will also be substantially at ground potential since it is connected through isolating resistor 174 to the collector of transistor 164, and gate 166 is disabled.

The collector of transistor 172 of gate 170 will be at a negative potential since it is connected through isolating resistor 178 to the collector of transistor 162, and gate 170 is enabled. The potential of input terminal 182 is substantially at ground potential, in the absence of a complementing input pulse, which maintains transistors 168, 172 cut off.

The application of a negative complementing pulse to input terminal 182 will have no effect on transistor 168 of disabled gate 166 since the collector of transistor 168 was substantially at ground potential. The application of a negative pulse to the base of transistor 172 will cause it to bottom, raising its collector substantially to ground potential, which applies a positive going pulse to input terminal 181. This positive pulse on the base of transistor 164 cuts off transistor 164. The collector of transistor 164 then becomes negative, which causes transistor 162 to bottom, raising the potential of the collector of transistor 162 to substantially ground potential, which maintains transistor 164 in its cut-off condition, and master flip-flop 160 has changed its state.

During the duration of the first negative complementing pulse, the potential of the collectors of transistors 168, 172 cannot go substantially negative and gates 166, 170 cannot reverse. When the pulse is removed, the potential of the collector of transistor 168 will become negative since it is connected to the collector of cut-off transistor 164. The potential of the collector of transistor 172 will remain substantially at ground potential since it is connected through isolating resistor 178 to the collector of bottomed transistor 162. Thus after the input pulse has been removed, the steering and inhibit gates reverse with gate 166 becoming enabled and gate 170 becoming disabled. Upon the application of the next succeeding, or second, complementing pulse, transistor 168 of enabled gate 166 will bottom, applying a positive going pulse to the base of transistor 162, which causes the master flip-flop to change its state. Gates 166, 170 will reverse after the termination of the second complementing pulse, and a complete cycle of operation is completed.

In Fig. 5 the collector supply voltages for transistors 168, 172 of gates 166, 170 is provided from master flip-flop 160. Resistance isolation is provided by resistors 174, 178 to insure that the triggering of the master flip-flop is by capacitor 176 or capacitor 180 and not by the D.-C. drop across either load resistor 188 or load resistor 190.

The state of master flip-flop 160 may be determined by the potentials of the collectors of transistors 162, 164, which also may serve as the output terminals for the complementing flip-flop. Master flip-flop 160 may be set and reset by means of pulses applied to one or the other of a pair of transistors, one being connected in parallel with transistor 162 and the other being connected in parallel with transistor 164, as illustrated and described with respect to the device of Fig. 2.

The device of Fig. 6 is an extension of the use of conditional steering to a complementing flip-flop including magnetic cores. It has additional advantages in that it may serve as a transducer between transistor and magnetic circuitry. The device of Fig. 6 has several unique characteristics; one of these is the relatively large load that it can drive, and another is that the manner of use of the magnetic cores results in higher apparent squareness ratios, or higher speeds, than predictable from the core characteristics.

In Fig. 6 the master flip-flop 200 has two junction transistors 202, 204 cross-coupled to form a saturated flip-flop. The steering and inhibiting functions are produced by one gate which includes transistor 206, magnetic cores 208, 212, and the other gate which includes transistor 210 and magnetic core 208, 212.

On core 208 there are placed four windings, trigger winding 214, reset winding 216, sensing winding 218, and set winding 220. On core 212 there are placed trigger winding 222, reset winding 224, sensing winding 226, and set winding 228. Each of the windings is indicated as having one terminal dotted and the other undotted. In the discussion that follows it will be assumed that conventional current flowing out of the dotted terminal of the winding will tend to change the state of the core to a magnetic state denoted as 1, and that conventional current flowing into the dotted terminal of a winding will tend to change the state of the core to a magnetic state denoted as 0.

The base of transistor 202, input terminal 230 of master flip-flop 200, is connected to the dotted terminal of sensing winding 226, and the base of transistor 204, input terminal 232 of master flip-flop 200, is connected to the dotted terminal of sensing winding 218. The undotted terminal of sensing winding 226 is connected to the collector of transistor 204, and the undotted terminal of sensing winding 218 is connected to the collector of transistor 202. The dotted terminal of set winding 228 is connected to the dotted terminal of reset winding 216. The undotted terminal of reset winding 216 is directly connected to the collector of transistor 206. The undotted terminal of set winding 228 is connected through load resistor 234 to a suitable source of collector potential, $V_{cc}$. The dotted terminal of reset winding 224 is directly connected to the dotted terminal of set winding 220. The undotted terminal of reset winding 224 is connected to the collector of transistor 210, and the undotted terminal of winding 220 is connected through load resistor 236 to a suitable source of collector potential. Trigger windings 214, 222 are connected in series. The collector of transistor 202 is connected to the base of transistor 206, and the collector of transistor 204 is likewise connected to the base of transistor 210. The collector of transistor 202 is connected through load resistor 238 to a suitable source of collector potential, $V_{cc}$ of the proper polarity. The collector of transistor 204 is likewise connected through load resistor 240 to a suitable source of collector potential, $V_{cc}$ of the proper potential.

For purposes of explaining the operation of the device illustrated in Fig. 6, it is assumed that the initial condition of master flip-flop 200 is such that transistor 202 is cut off and transistor 204 is bottomed. Then, transistor 206, whose base is directly connected to the collector of transistor 202, will be bottomed and transistor 210, whose base is connected to the collector of transistor 204, will be cut off. The collector current of transistor 206 will flow in reset winding 216 and set winding 228 of cores 208 and 212, respectively. The magnetomotive force due to the collector current of transistor 206 flowing in these coils puts core 208 in the 1 state and core 212 in the 0 state. The magnetomotive force contributed by the base current of transistor 204 flowing through sensing winding 218 is negligible in comparison.

If a first complementing pulse of current is applied to input terminal 242 and flows through trigger windings 214, 222 in such a direction as to drive cores 208, 212 to the 1 state, core 208 will not switch, or change its magnetic state, since it is already in the 1 state. However, core 212, which is in the 0 state, is switched by the trigger pulse to the 1 state. The switching of core 212 from the 0 to the 1 state induces a voltage in sensing winding 226, which causes its dotted terminal to be at a relatively negative potential. Since input terminal 230 is connected to the dotted terminal of sensing winding 226, the negative potential induced in sensing winding 226 bottoms transistor 202.

When transistor 202 bottoms, the potential of its collector increases approximately to ground level which causes transistor 206 to cut off. This increase is connected through winding 218 to the input terminal 232, cutting off transistor 204 and changing the state of master flip-flop 200. The potential of the collector of transistor 204 decreases, becomes more negative, which maintains transistor 202 bottomed. When transistor 204 cuts off, the negative potential of its collector bottoms transistor 210. The collector current of transistor 210 then flows through reset winding 224 and set winding 220.

The magnetomotive force of the complementing pulse is of sufficient magnitude to overcome the opposing magnetomotive force produced by the collector current of transistor 210, holding both core 208 and core 212 in the 1 state for the duration of the input pulse. Upon the conclusion of the input pulse, cores 208, 212 are released to control the master flip-flop 200 acting through transistor 210. Since transistor 210 is bottomed, its collector current flows through reset winding 224 and set winding 220, changing the state of core 208 to the 0 or enabled state. Core 212 remains in the 1, or disabled, state. The spurious pulses produced by core 208 changing from the 1 to the 0 state are in such directions as to maintain the new state of master flip-flop 200.

The application of the next, or second, complementing input current pulse will change core 208 from the 0 to the 1 state inducing a negative potential in sensing winding 218, which is applied to input terminal 232, the base of transistor 204, causing transistor 204 to bottom, which causes transistor 202 to cut off, changing the state of master flip-flop 200. When transistor 204 bottoms, its collector approaches ground potential cutting off transistor 210. While the second complementing pulse is present, it maintains cores 208, 212 in the 1 state. When the second complementing pulse terminates, the collector current of transistor 206 flows through windings 216, 228, switching core 212 to the 0, or enabled, state and maintaining core 208 in the 1 or disabled, state.

Master flip-flop 200 has a definite triggering threshold; thus the complementing flip-flop will have sufficient noise immunity to permit reliable operation at relatively low signal-to-noise ratios. When the master flip-flop is at rest, the state of cores 208, 212 is controlled by master flip-flop 200 through transistors 206, 210. Transistors 206, 210 provide isolation between master flip-flop 200 and cores 208, 212, which results in improved performance of the device. The D.C. magnetomotive force applied to the cores controls their operation, giving in effect biased cores whose natural remanence points are relatively unimportant. As a result, it is possible to accurately establish a suitable pseudo-remanence, or D.C. operating point by the choice of the number of turns wound on the cores and the steady state transistor-collector currents.

Since transistors 206, 210 are either cut off or bottomed, their collectors currents are determined only by the collector supply potential $V_{cc}$ and the values of resistors 234, 236. The pseudo-remanence effect may be exploited to provide very large signal-to-noise ratios, or to make possible operation with nonsquare magnetic cores such as ferrites. The degree of nonsquareness permitted of the cores is determined by the available magnetomotive force and the minimum signal-to-noise ratio required.

The factors which make core-squareness noncritical make it possible to operate the complementing flip-flop at complementing pulse repetition frequencies considerably in excess of those predicted on the basis of complete core switching. Once the change of flux in a core is sufficient to trigger master flip-flop 200, completion of core switching is not essential, provided that by the time the next complementing pulse is applied, the core is sufficiently close to its opposite remanence (or pseudo-remanence) to initiate the next cycle. Accordingly, a high complementing pulse repetition frequency can coerce the cores into alternate states in a much shorter period of time than that required for complete switching without prejudicing reliable triggering of the master flip-flop.

The complementing flip-flop of Fig. 6 also provides a D.C. level to indicate the core states since the potentials of the collectors of transistors 206, 210 indicate the states of cores 208, 212. This characteristic provides for nondestructive readout. Transistors 206, 210 also serve to isolate the switching wave forms appearing across load resistors 236, 234 due to changes in state of the master flip-flop 200.

The state of master flip-flop 200 may be determined by the potentials of the collectors of transistors 202, 204 of the master flip-flop or by the potentials of collectors 206, 210 of the steering gates. These terminals may also serve as the output terminals of the complementing flip-flop. Master flip-flop 200 may be set or reset by means of pulses applied to one or the other of a pair of transistors, one being connected in parallel with transistor 202 and the other being connected in parallel with transistor 204, as illustrated and described with respect to the device of Fig. 2.

In the examples of the embodiments of the invention illustrated in Figs. 1, 2, 4, and 5, all the transistors used were SB100's; in the example of the embodiment of the invention illustrated in Fig. 6, all the transistors are 2N113's. The complementing flip-flops of Figs. 1, 2, 4, 5, and 6 have been illustrated and described as using pnp transistors. As is well known in the art, npn transistors may be substituted for pnp transistors provided the polarities of the supply voltages and the polarities of the triggering signals are reversed.

The values and/or types of components and the voltages appearing on the drawings are included, by way of example only, as being suitable for the devices illustrated. It is to be understood that circuit specifications in accordance with the invention may vary with the design of any particular application.

Obviously, many modifications and variations of the present invention are possible in the light of the above teachings. It is, therefore, to be understood that within the scope of the appended claims, the invention may be practiced other than as specifically described and illustrated.

What is claimed is:

1. A complementing flip-flop comprising a master flip-flop comprising a pair of cross-coupled transistors and including a first and a second input terminal, said master flip-flop being capable of assuming either of two stable states and assuming one of its two states when a pulse is applied to the first input terminal and assuming the other of its two states when a pulse is applied to the second input terminal, first gating means and second gating means, said gating means each comprising a first and a second transistor connected in parallel and having two conditions, an enabled condition and a disabled condition, each of the said gating means transistors having a base, a collector, and an emitter, circuit means for applying a complementing pulse to the base of each first transistor of the first and second gating means to effect complementing of the master flip-flop, circuit means forming a direct-current connection between the base of each second transistor of the first and second gating means and the base of a different one of the transistors of the master flip-flop so that when one gating means is enabled, the other gating means is disabled, each of said gating means being enabled when its second transistor is cut off and being disabled when its second transistor is conducting, the potential of the collectors of the transistors of an enabled gate changing suddenly to produce a pulse when a complementing pulse is applied to the gating means, and circuit means for coupling the change in potential at the collectors of the transistors of the enabled gating means to the master flip-flop to cause the master flip-flop to change state.

2. A complementing flip-flop comprising a master flip-flop including a pair of transistors each having emitter, base and collector electrodes, said master flip-flop having a first input terminal and a second input terminal, a first steering and inhibit gate and a second steering and inhibit gate, each of said gates including a pair of transistors each having emitter, base and collector electrodes and having their collectors and emitters connected respectively together, an input terminal for the complementing flip-flop, circuit means for connecting the input terminal of the complementing flip-flop to the base of one of the transistors of each of the steering and inhibit gates, circuit means for connecting the base of the other transistor of the first steering and inhibit gate to the base of one of the transistors of the master flip-flop, circuit means for connecting the base of the other transistor of the second steering and inhibit gate to the base of the other transistor of the master flip-flop, alternating-current circuit means for coupling the collectors of the transistors of the first steering and inhibit gate to the base of the other transistor of the master flip-flop, and alternating-current circuit means for coupling the collectors of the transistors of the second steering and inhibit gate to the base of said one transistor of the master flip-flop.

3. A complementing flip-flop comprising a master saturation flip-flop including a pair of direct-coupled transistors, said master flip-flop having a first input terminal and a second input terminal, a first gate and a second gate, each of said gates having a first and a second transistor connected in parallel, an input terminal for the complementing flip-flop, circuit means connecting the input terminal of the complementing flip-flop to the base of the first transistor of each of said gates, a first capacitor connecting the collectors of the transistors of the first gate to the first input terminal of the master flip-flop, a second capacitor connecting the collectors of the transistors of the second gate to the second input terminal of the master flip-flop, circuit means connecting the base of the second transistor of the first gate to the second input terminal of the master flip-flop, and circuit means connecting the base of the second transistor of the second gate to the first input terminal of the master flip-flop.

4. A complementing flip flop comprising a pair of transistors each having emitter, base and collector and having their respective bases and collectors cross-coupled and their emitters connected to a point of reference potential; means for connecting a source of supply voltage to the collectors of both flip-flop transistors; first and second steering gate means coupled in shunt across the respective collector-emitter paths of said flip-flop transistors, each of said first and second steering gates comprising a pair of transistors each having emitter, base and collector and having their collector-emitter paths connected in parallel and a capacitor in series with said parallel connection; direct-current means connecting the base of one of said flip-flop transistors to the base of one transistor of said first gating means; direct-current means connecting the base of the other of said flip-flop transistors to the base of one transistor of said second gating means, whereby one of said one gate transistors is biased "on" and the other of said one gate transistors is biased "off" according to the state of said flip flop; input means for applying an input signal simultaneously to the base of the other transistor of each gating means to turn "on" both said other gate transistors, thereby to place the collectors of all of said gate transistors at substantially said reference potential, thereby to effect an abrupt change in the potential at the collectors of one pair but not at the other pair of gate transistors, thereby to pass a voltage pulse by way of said series capacitor of one only of said gating means to the base of one of said flip-flop transistors to bias "off" said flip-flop transistor, thereby to change the state of said flip flop, the potential at the collectors of both pairs of gate transistors being held at substantially reference potential by said applied input pulse for the duration thereof despite the change in the conducting states of the other gate transistor of each pair when said flip flop changed state.

5. A complementing flip flop comprising a pair of transistors each having emitter, base and collector and having their respective bases and collectors cross-coupled and their emitters connected to a point of reference potential; means for connecting a source of supply voltage to the collectors of both flip-flop transistors; first and second steering gate means coupled in shunt across the respective collector-emitter paths of said flip-flop transistors, each of said steering gates comprising a pair of transistors each having emitter, base and collector and having their collector-emitter paths connected in parallel and a capacitor in series with said parallel connection; direct-current means connecting the base of one of said flip-flop transistors to the base of one of the transistors of said first gating means; direct-current means connecting the bases of the other of said flip-flop transistors to the base of one transistor of said second gating means; and input means for applying an input signal simultaneously to the base of the other transistor of each gating means to turn "on" both of said other gate transistors, thereby to change the state of said flip flop irrespective of its resident state at the time of application of the input signal.

References Cited in the file of this patent

UNITED STATES PATENTS

| | | |
|---|---|---|
| 2,644,887 | Wolfe | July 7, 1953 |
| 2,719,228 | Auerbach | Sept. 27, 1955 |
| 2,816,237 | Hageman | Dec. 10, 1957 |